US012768822B2

(12) United States Patent
Lee et al.

(10) Patent No.: US 12,768,822 B2
(45) Date of Patent: Oct. 20, 2026

(54) MUTUALLY INDEPENDENT DUAL ONLINE LIQUID CHROMATOGRAPHY DEVICE AND CONTROL METHOD THEREOF

(71) Applicants: Korea University Research and Business Foundation, Seoul (KR); BERTIS INC., Seongnam-si (KR)

(72) Inventors: Sang-Won Lee, Seoul (KR); Chaewon Kang, Seoul (KR)

(73) Assignees: Korea University Research and Business Foundation, Seoul (KR); BERTIS INC., Seongnam-si (KR)

( * ) Notice: Subject to any disclaimer, the term of this patent is extended or adjusted under 35 U.S.C. 154(b) by 681 days.

(21) Appl. No.: 18/157,219

(22) Filed: Jan. 20, 2023

(65) Prior Publication Data

US 2023/0236158 A1 Jul. 27, 2023

(30) Foreign Application Priority Data

Jan. 24, 2022 (KR) ........................ 10-2022-0009849

(51) Int. Cl.

*G01N 30/20* (2006.01)
*G01N 30/02* (2006.01)
*G01N 30/34* (2006.01)

(52) U.S. Cl.

CPC ............. *G01N 30/20* (2013.01); *G01N 30/34* (2013.01); *G01N 2030/027* (2013.01); *G01N 2030/201* (2013.01)

(58) Field of Classification Search

None
See application file for complete search history.

(56) References Cited

U.S. PATENT DOCUMENTS

2017/0176400 A1 6/2017 Lee et al.

FOREIGN PATENT DOCUMENTS

CN 105664527 A 6/2016
CN 209198398 U 8/2019
KR 10-2015-0112414 A 10/2015

OTHER PUBLICATIONS

Knut Wagner, et al., "An Automated On-Line Multidimensional HPLC System for Protein and Peptide Mapping with Integrated Sample Preparation", Anal. Chem., 2002, vol. 74, No. 4, XP-001115830, pp. 809-820 (12 pages).

*Primary Examiner* — Kara M Peo
(74) *Attorney, Agent, or Firm* — Sughrue Mion, PLLC

(57) ABSTRACT

Disclosed are a mutually independent dual online liquid chromatography device and a control method thereof. The mutually independent dual online liquid chromatography device according to the present disclosure includes a first pump configured to inject a first solvent or a mixed solution containing the first solvent and a second solvent; a second pump configured to inject the first solvent or the mixed solution containing the first solvent and the second solvent; a sample inlet valve to which the first pump and a sample injector configured to inject a sample are connected; a first column valve to which a first sample separation column is connected; a second column valve to which a second sample separation column is connected; and a column selection valve to which the second pump is connected, and interposed between the sample inlet valve, and the first column valve and the second column valve to inject the sample fed from the sample inlet valve onto any one of the first sample separation column and the second sample separation column to separate and analyze the sample in one sample separation column while allowing for wash and equilibration, sample injection and isocratic elution of the other sample separation column.

9 Claims, 7 Drawing Sheets

MUTUALLY INDEPENDENT DUAL ONLINE LIQUID CHROMATOGRAPHY DEVICE AND CONTROL METHOD THEREOF

CROSS-REFERENCE TO RELATED APPLICATION

This application claims priority to Korean Patent Application No. 10-2022-0009849, filed on Jan. 24, 2022, and all the benefits accruing therefrom under 35 U.S.C. § 119, the contents of which in its entirety are herein incorporated by reference.

BACKGROUND

1. Field

The present disclosure relates to a mutually independent dual online liquid chromatography device and a control method thereof.

2. Description of the Related Art

In proteomics which is the large-scale study of proteins expressed in living organisms under specific conditions, liquid chromatography with tandem mass spectrometry (LC-MS/MS) is emerging as a very important technology. A bottom-up approach used as a typical example analyzes proteins by hydrolyzing the proteins to smaller pieces, peptides, before analysis using a mass spectrometer.

The bottom-up approach is found to be effective, but the process of hydrolyzing proteins into peptides inevitably causes sample complexity. For example, at least a few tens of millions of peptides are obtained when hydrolyzing proteins expressed from about 20,000 genomes.

Accordingly, to solve the sample complexity issue, it is still necessary to improve efficiency and sensitivity of liquid chromatography.

It is known that sensitivity of liquid chromatography-tandem mass spectrometry (LC-MS/MS) experiment may sharply increase when reducing the inner diameter while keeping the length of the sample separation column constant.

However, the existing liquid chromatography device requires a long time to equilibrate or regenerate columns when hydrophobic media are packed in capillary columns having a large length and a small inner diameter.

In this circumstance, the applicant developed a dual online liquid chromatography device in which an analytic experiment is performed in one of the columns while the other column is being washed and equilibrated to minimize the dead time needed to stop the experiment during column equilibration, thereby speeding up the experiment by about two times.

However, the existing dual online liquid chromatography device employs one valve to which two reverse phase liquid chromatography columns (hereinafter referred to as "sample separation column") are connected together, so when sample analysis is being conducted in the first sample separation column, the second sample separation column is only allowed to be equilibrated. That is, the existing dual online liquid chromatography device fails to completely independently run the two sample separation columns.

Thus, the existing dual online liquid chromatography device needs valve switching after completing the sample separation experiment in the first sample separation column to proceed with the next sample injection onto the second sample separation column, and thus it requires the dead time needed to substantially stop the mass spectrometer for the period of time from the sample injection time until the elution of the sample.

Additionally, to improve the efficiency and sensitivity of the sample separation column, the sample separation column having a large length is used, resulting in increased length over which the sample goes from the sample separation column to the mass spectrometer, and as a consequence, the mass spectrometer has the mass signal dead time during which peptide is not detected while the first peptide is eluted from the sample separation column.

RELATED LITERATURES

Patent Literature

[Literature 1] Korean Patent Publication No. 10-2015-0112414 (published on Oct. 7, 2015)

SUMMARY

Accordingly, the present disclosure is directed to providing a mutually independent dual online liquid chromatography device and a control method thereof, in which two sample separation columns can be used completely independently of each other to allow for wash and equilibration, sample injection and isocratic elution of one sample separation column while sample analysis is being conducted in the other sample separation column, thereby eliminating the time necessary for wash and column equilibration, sample injection and initial peptide elution time, thus improving the efficiency of the liquid chromatography-mass spectrometry (LC-MS) experiment as well as the separation of hydrophilic peptides, minimizing the mass signal dead time of the mass spectrometer and maximizing the reverse phase chromatography separation space, thereby greatly improving the peptide detection.

According to an aspect of the present disclosure, there is provided a mutually independent dual online liquid chromatography device including a first pump configured to inject a first solvent or a mixed solution containing the first solvent and a second solvent; a second pump configured to inject the first solvent or the mixed solution containing the first solvent and the second solvent; a sample inlet valve to which the first pump and a sample injector configured to inject a sample are connected; a first column valve to which a first sample separation column is connected; a second column valve to which a second sample separation column is connected; and a column selection valve to which the second pump is connected, and interposed between the sample inlet valve, and the first column valve and the second column valve to inject the sample fed from the sample inlet valve onto any one of the first sample separation column and the second sample separation column to separate and analyze the sample in one sample separation column while allowing for wash and equilibration, sample injection and isocratic elution of the other sample separation column.

The sample inlet valve may include a sample inlet port connected to the sample injector; a sample outlet port disposed adjacent to the sample inlet port; a first pump connection port connected to the first pump; a first outlet port disposed adjacent to the first pump connection port and connected to the column selection valve; and a first sample storage loop connection port and a second sample storage loop connection port to which two ends of a sample storage loop are respectively connected, and in a state that the first sample storage loop connection port and the second sample storage loop connection port are connected to the sample inlet port and the sample outlet port, respectively, the sample may be stored in the sample storage loop, and in a state that the first sample storage loop connection port and the second sample storage loop connection port are connected to the first pump connection port and the first outlet port, respectively, the first pump may inject the first solvent onto the first pump connection port to feed the sample stored in the sample storage loop into the column selection valve together with the first solvent.

The first column valve may include a first solid phase extraction column connected to the first sample separation column, the second column valve may include a second solid phase extraction column connected to the second sample separation column, and the column selection valve may include a first inlet port connected to the sample inlet valve; a first column valve connection port connected to the first column valve; a second column valve connection port connected to the second column valve; and a second pump connection port connected to the second pump, and in a state that the sample inlet valve, the first inlet port and the first column valve connection port are connected, the column selection valve may allow for equilibration of the first solid phase extraction column and the first sample separation column, sample injection and isocratic elution, and in a state that the sample inlet valve, the first inlet port and the second column valve connection port are connected, allow for equilibration of the second solid phase extraction column and the second sample separation column, sample injection and isocratic elution.

The first column valve may include a first solid phase extraction column connection port and a first solid phase extraction column transit port connected to two ends of the first solid phase extraction column, respectively; a first solid phase extraction column inlet port connected to the column selection valve, and selectively connected to the first solid phase extraction column connection port and the first solid phase extraction column transit port; a first sample separation column connection port connected to the first sample separation column, and connected to or disconnected from the first solid phase extraction column connection port; and a second outlet port disposed adjacent to the first solid phase extraction column transit port and connected to or disconnected from the first solid phase extraction column transit port, and the second column valve may include a second solid phase extraction column connection port and a second solid phase extraction column transit port connected to two ends of the second solid phase extraction column, respectively; a second solid phase extraction column inlet port connected to the column selection valve, and selectively connected to the second solid phase extraction column connection port and the second solid phase extraction column transit port; a second sample separation column connection port connected to the second sample separation column, and connected to or disconnected from the second solid phase extraction column connection port; and a third outlet port disposed adjacent to the second solid phase extraction column transit port and connected to or disconnected from the second solid phase extraction column transit port.

According to another aspect of the present disclosure, there is provided a method for controlling a mutually independent dual online liquid chromatography device including (A) storing a sample in a sample storage loop of a sample inlet valve, and at the same time, equilibrating a first sample separation column of a first column valve and a second sample separation column of a second column valve; (B) performing isocratic elution from the first sample separation column, and at the same time, continuously equilibrating the second sample separation column; (C) performing valve switching of a column selection valve to perform gradient elution from the first sample separation column and separation and analysis of the sample, and at the same time, perform equilibration of the second sample separation column, sample injection and isocratic elution; (D) completing the separation and analysis of the sample in the first sample separation column and the isocratic elution from the second sample separation column at the same time; (E) performing valve switching of the column selection valve to perform gradient elution from the second sample separation column and separation and analysis of the sample, and at the same time, performing wash and equilibration of the first sample separation column, sample injection and isocratic elution; (F) completing the separation and analysis of the sample in the second sample separation column and the isocratic elution from the first sample separation column at the same time; and (G) performing the steps (C) to (F) in a sequential order repeatedly according to the number of times of separation and analysis of the sample or the number of samples, wherein the step (C) includes washing the second sample separation column before the equilibration of the second sample separation column, the sample injection and the isocratic elution.

The step (A) may include (A-1) injecting and storing, by a sample injector connected to the sample inlet valve, the sample in the sample storage loop; (A-2) injecting, by a first pump connected to the sample inlet valve, a first solvent onto the first solid phase extraction column and the first sample separation column of the first column valve via the column selection valve to equilibrate the first solid phase extraction column and the first sample separation column; and (A-3) injecting, by a second pump connected to the column selection valve, the first solvent onto the second solid phase extraction column and the second sample separation column of the second column valve to equilibrate the second solid phase extraction column and the second sample separation column.

The sample inlet valve may include a sample inlet port connected to the sample injector; a sample outlet port disposed adjacent to the sample inlet port; a first pump connection port connected to the first pump; a first outlet port disposed adjacent to the first pump connection port and connected to the column selection valve; and a first sample storage loop connection port and a second sample storage loop connection port to which two ends of the sample storage loop are connected respectively, and the step (A-1) may include storing the sample in the sample storage loop in a state that the first sample storage loop connection port and the second sample storage loop connection port are connected to the sample inlet port and the sample outlet port, respectively.

The column selection valve may include a first inlet port connected to the first outlet port; a first column valve connection port connected to the first column valve; a second column valve connection port connected to the second column valve; and a second pump connection port connected to the second pump, the step (A-2) may include, in a state that the first pump connection port, the first outlet port, the first inlet port and the first column valve connection port are connected, injecting, by the first pump, the first solvent onto the first solid phase extraction column and the first sample separation column to equilibrate the first solid phase extraction column and the first sample separation column, and the step (A-3) may include, in a state that the second pump connection port and the second column valve connection port are connected, injecting, by the second pump, the first solvent onto the second solid phase extraction column and the second sample separation column to equilibrate the second solid phase extraction column and the second sample separation column.

The first column valve may include a first solid phase extraction column connection port and a first solid phase extraction column transit port connected to two ends of the first solid phase extraction column, respectively; a first solid phase extraction column inlet port connected to the first column valve connection port, and selectively connected to the first solid phase extraction column connection port and the first solid phase extraction column transit port; a first sample separation column connection port connected to the first sample separation column, and connected to or disconnected from the first solid phase extraction column connection port; and a second outlet port disposed adjacent to the first solid phase extraction column transit port and connected to or disconnected from the first solid phase extraction column transit port, and the second column valve may include a second solid phase extraction column connection port and a second solid phase extraction column transit port connected to two ends of the second solid phase extraction column, respectively; a second solid phase extraction column inlet port connected to the second column valve connection port, and selectively connected to the second solid phase extraction column connection port and the second solid phase extraction column transit port; a second sample separation column connection port connected to the second sample separation column, and connected to or disconnected from the second solid phase extraction column connection port; and a third outlet port disposed adjacent to the second solid phase extraction column transit port and connected to or disconnected from the second solid phase extraction column transit port, and the method may further include, after the step (A), in a state that the first solid phase extraction column inlet port and the first solid phase extraction column connection port are connected and the first solid phase extraction column transit port and the second outlet port are connected, injecting the sample stored in the sample storage loop onto the first solid phase extraction column together with the first solvent fed from the first pump and desalting and concentrating the sample; and in a state that the second solid phase extraction column inlet port and the second solid phase extraction column transit port are connected and the second solid phase extraction column connection port and the second sample separation column connection port are connected, injecting, by the second pump, the first solvent onto the second solid phase extraction column and the second sample separation column to continuously equilibrate the second solid phase extraction column and the second sample separation column.

The step (B) may include, in a state that the first solid phase extraction column inlet port and the first solid phase extraction column transit port are connected and the first solid phase extraction column connection port and the first sample separation column connection port are connected, injecting, by the first pump, a mixed solution containing the first solvent and a second solvent onto the first solid phase extraction column and the first sample separation column and performing the isocratic elution.

The step (C) may include (C-1) injecting, by the second pump, the mixed solution containing the increasing second solvent over time onto the first solid phase extraction column and the first sample separation column to perform gradient elution and separation and analysis of the sample, and at the same time, injecting, by the first pump, the first solvent onto the second solid phase extraction column and the second sample separation column to continuously equilibrate the second solid phase extraction column and the second sample separation column and store the sample in the sample storage loop; (C-2) during the separation and analysis of the sample in the first sample separation column, injecting, by the first pump, the first solvent onto the sample storage loop to inject the sample stored in the sample storage loop onto the second solid phase extraction column and desalt and concentrate the sample; and (C-3) during the separation and analysis of the sample in the first sample separation column, injecting, by the first pump, the mixed solution containing the first solvent and the second solvent onto the second solid phase extraction column and the second sample separation column to perform the isocratic elution.

The step (C-1) may include, in a state that the second pump connection port and the first column valve connection port are connected, the first solid phase extraction column inlet port and the first solid phase extraction column transit port are connected and the first solid phase extraction column connection port and the first sample separation column connection port are connected, injecting, by the second pump, the mixed solution containing the increasing second solvent over time onto the first solid phase extraction column and the first sample separation column to perform gradient elution and separation and analysis of the sample, and at the same time, in a state that the first pump connection port and the first outlet port are connected, the first inlet port and the second column valve connection port are connected, the second solid phase extraction column inlet port and the second solid phase extraction column transit port are connected and the second solid phase extraction column connection port and the second sample separation column connection port are connected, injecting, by the first pump, the first solvent onto the second solid phase extraction column and the second sample separation column to continuously equilibrate the second solid phase extraction column and the second sample separation column, and at the same time, in a state that the first sample storage loop connection port and the second sample storage loop connection port are connected to the sample inlet port and the sample outlet port, respectively, receiving the sample from the sample injector and injecting and storing the sample in the sample storage loop, the step (C-2) may include, in a state that the first pump connection port, the first sample storage loop connection port, the second sample storage loop connection port and the first outlet port are connected, the first inlet port and the second column valve connection port are connected, the second solid phase extraction column inlet port and the second solid phase extraction column connection port are connected and the second solid phase extraction column transit port and the third outlet port are connected, injecting the sample stored in the sample storage loop onto the second solid phase extraction column together with the first solvent fed from the first pump and desalting and concentrating the sample, and the step (C-3) may include, in a state that the first pump connection port and the first outlet port are connected, the first inlet port and the second column valve connection port are connected, the second solid phase extraction column inlet port and the second solid phase extraction column transit port are connected and the second solid phase extraction column connection port and the second sample separation column connection port are connected, injecting, by the first pump, the mixed solution containing the first solvent and the second solvent onto the second solid phase extraction column and the second sample separation column to perform the isocratic elution.

When the step (G) includes repeatedly performing the steps (C) to (F) in a sequential order, the step (C-1) may include, before equilibrating the second solid phase extraction column and the second sample separation column, in a state that the first pump connection port and the first outlet port are connected and the first inlet port and the second column valve connection port are connected, injecting, by the first pump, the mixed solution containing the first solvent and the second solvent onto the second solid phase extraction column and the second sample separation column to wash the second solid phase extraction column and the second sample separation column.

The step (D) may include matching an end time of the separation and analysis of the sample in the first sample separation column with a time immediately before a first peptide is eluted from the second sample separation column.

The step (E) may include (E-1) feeding, by the second pump, the mixed solution containing the increasing second solvent over time into the second solid phase extraction column and the second sample separation column and performing gradient elution and separation and analysis of the sample, and at the same time, injecting, by the first pump, the mixed solution containing the first solvent and the second solvent onto the first solid phase extraction column and the first sample separation column to wash the first solid phase extraction column and the first sample separation column, and feeding the first solvent into the first solid phase extraction column and the first sample separation column to continuously equilibrate the first solid phase extraction column and the first sample separation column and store the sample in the sample storage loop; (E-2) during the separation and analysis of the sample in the second sample separation column, injecting, by the first pump, the first solvent onto the sample storage loop to inject the sample stored in the sample storage loop onto the first solid phase extraction column and desalt and concentrate the sample; and (E-3) during the separation and analysis of the sample in the second sample separation column, feeding, by the first pump, the mixed solution containing the first solvent and the second solvent into the first solid phase extraction column and the first sample separation column to perform the isocratic elution.

The step (E-1) may include, in a state that the second pump connection port and the second column valve connection port are connected, the second solid phase extraction column inlet port and the second solid phase extraction column transit port are connected and the second solid phase extraction column connection port and the second sample separation column connection port are connected, feeding, by the second pump, the mixed solution containing the increasing second solvent over time into the second solid phase extraction column and the second sample separation column to perform gradient elution and separation and analysis of the sample, and at the same time, in a state that the first pump connection port and the first outlet port are connected, the first inlet port and the first column valve connection port are connected, the first solid phase extraction column inlet port and the first solid phase extraction column transit port are connected and the first solid phase extraction column connection port and the first sample separation column connection port are connected, injecting, by the first pump, the mixed solution containing the first solvent and the second solvent onto the first solid phase extraction column and the first sample separation column to wash the first solid phase extraction column and the first sample separation column and injecting the first solvent onto the first solid phase extraction column and the first sample separation column to equilibrate the first solid phase extraction column and the first sample separation column, and at the same time, in a state that the first sample storage loop connection port and the second sample storage loop connection port are connected to the sample inlet port and the sample outlet port, respectively, receiving the sample from the sample injector and injecting and storing the sample in the sample storage loop, the step (E-2) may include, in a state that the first pump connection port, the first sample storage loop connection port, the second sample storage loop connection port and the first outlet port are connected, the first inlet port and the first column valve connection port are connected, the first solid phase extraction column inlet port and the first solid phase extraction column connection port are connected and the first solid phase extraction column transit port and the second outlet port are connected, injecting the sample stored in the sample storage loop onto the first solid phase extraction column together with the first solvent fed from the first pump and desalting and concentrating the sample, and the step (E-3) may include, in a state that the first pump connection port and the first outlet port are connected, the first inlet port and the first column valve connection port are connected, the first solid phase extraction column inlet port and the first solid phase extraction column transit port are connected and the first solid phase extraction column connection port and the first sample separation column connection port are connected, injecting, by the first pump, the mixed solution containing the first solvent and the second solvent onto the first solid phase extraction column and the first sample separation column and performing the isocratic elution.

The step (F) may include matching an end time of the separation and analysis of the sample in the second sample separation column with a time immediately before the first peptide is eluted from the first sample separation column.

According to an embodiment of the present disclosure, it is possible to achieve continuous analysis without the influence of the dead time needed to stop the mass spectrometer during column equilibration by washing and equilibrating the second sample separation column while separating and analyzing the sample in the first sample separation column.

Additionally, according to an embodiment of the present disclosure, since the first solid phase extraction column and the first sample separation column, and the second solid phase extraction column and the second sample separation column are mounted in the first column valve having 6 ports and the second column valve having 6 ports, respectively, it is possible to allow for sample injection onto the second solid phase extraction column by switching the second column valve while the sample is separated and analyzed in the first sample separation column of the first column valve, thereby achieving continuous analysis without the influence of the dead time for sample injection and achieving fast sample injection, thus maximizing analysis efficiency.

Additionally, according to an embodiment of the present disclosure, after the sample is injected onto the second solid phase extraction column while the sample is separated and analyzed in the first sample separation column, the second column valve is switched again to allow for isocratic elution of the sample injected onto the second solid phase extraction column through the second sample separation column for the time required for the sample to go from the long sample separation column until immediately before the mass spectrometer, to match the time immediately before the end of separation and analysis in the first sample separation column with the time at which the first peptide is eluted from the second sample separation column, so that separation and analysis in the second sample separation column starts as soon as separation and analysis in the first sample separation column ends, thereby minimizing the mass signal dead time of the mass spectrometer and maximizing the reverse phase chromatography separation space, thus improving the separation performance of hydrophilic samples.

Additionally, according to an embodiment of the present disclosure, the automatic switching valve can automate all the experimental processes, thereby maximize reproducibility of experiments.

DETAILED DESCRIPTION

To fully understand the present disclosure, the operational advantages of the present disclosure and the objectives achieved by the embodiment of the present disclosure, reference is made to the accompanying drawings depicting an exemplary embodiment of the present disclosure and the description in the accompanying drawings.

Hereinafter, an exemplary embodiment of the present disclosure will be described with reference to the accompanying drawings to provide a detailed description of the present disclosure. Like reference signs presented in each drawing denote like elements.

Figure 1:
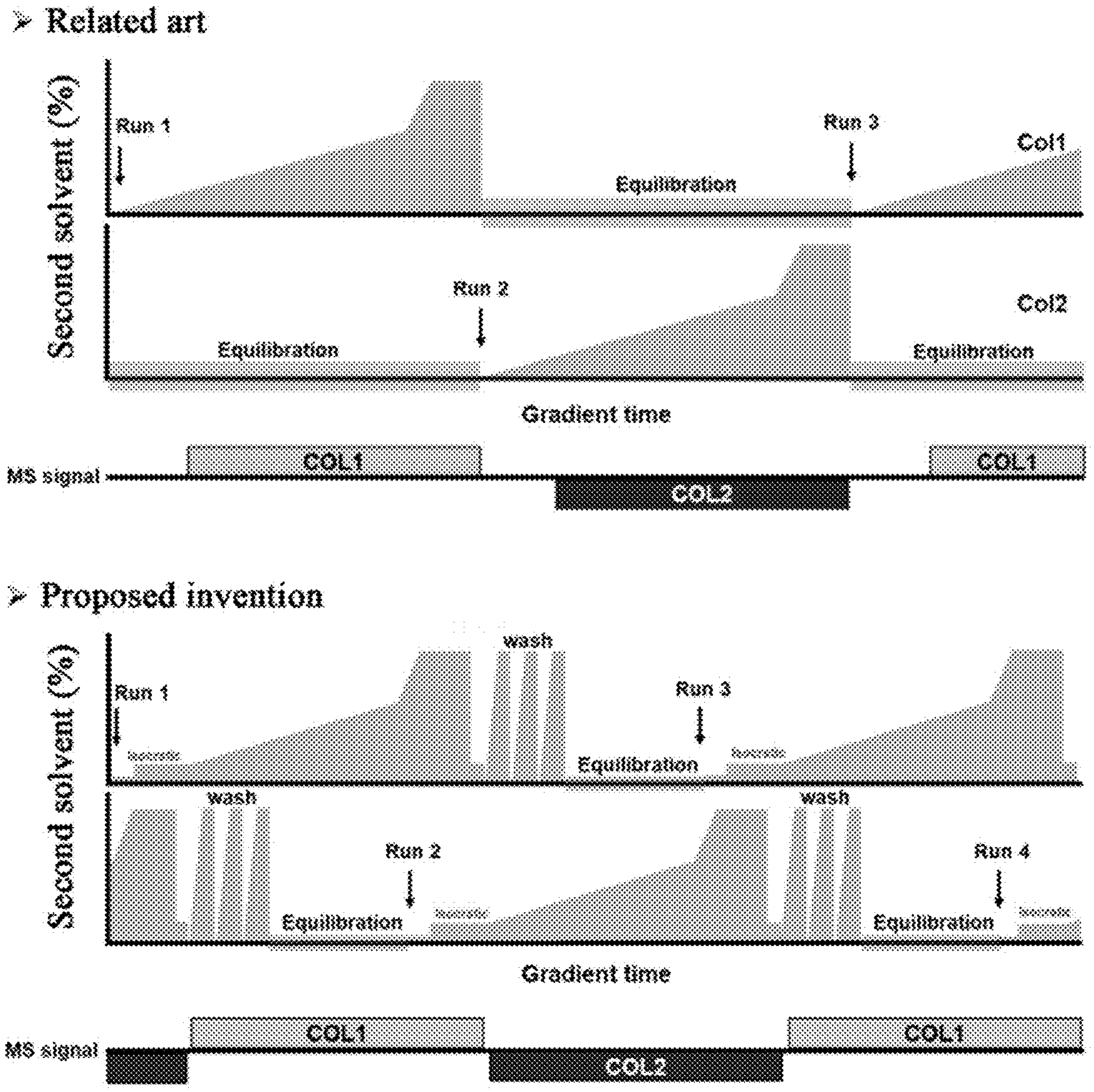
FIG. 1 is a graph illustrating the operation of a mutually independent dual online liquid chromatography device according to the present disclosure.
Figure 2:
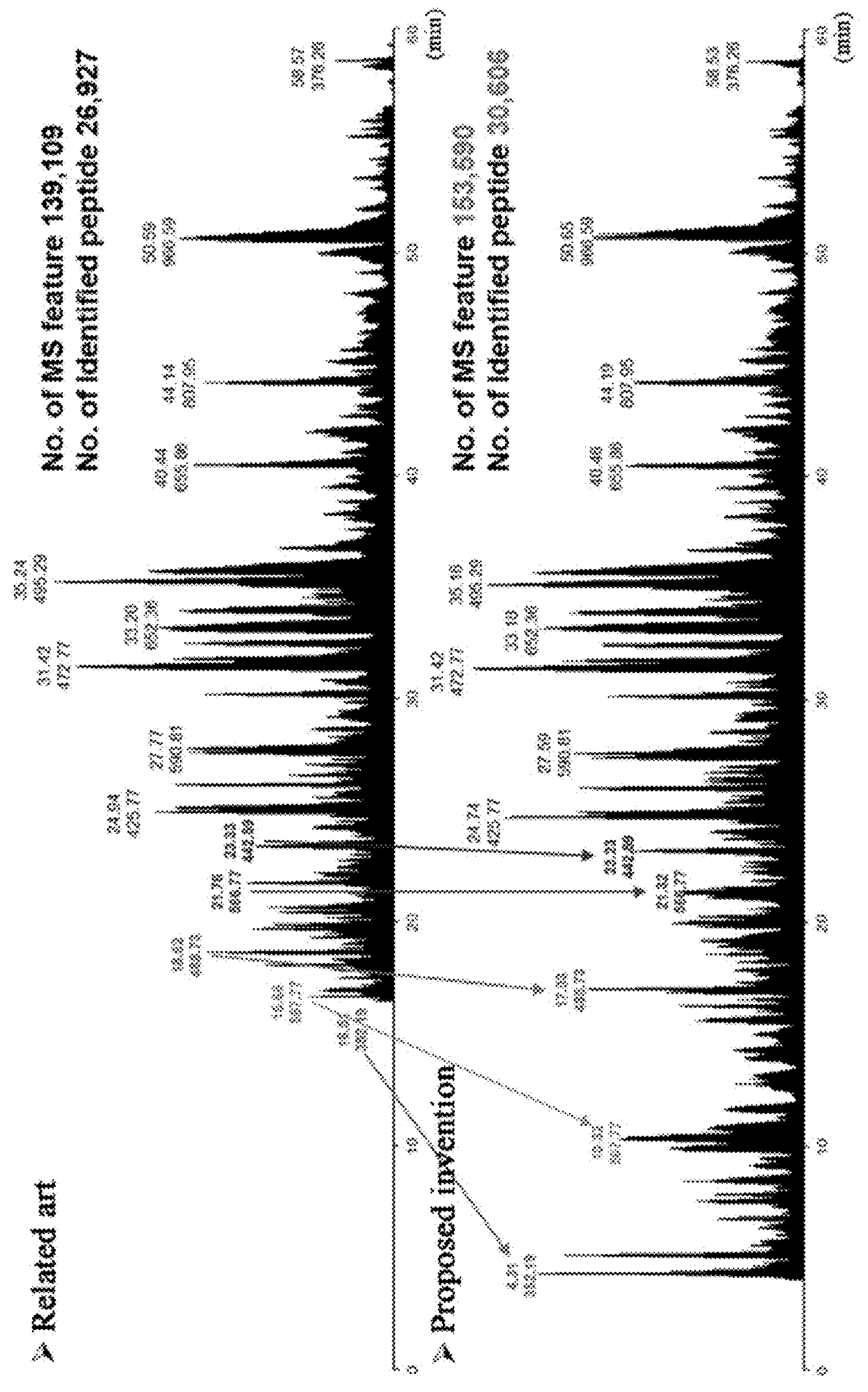
FIG. 2 is a graph illustrating the improved separation performance of hydrophilic samples by a mutually independent dual online liquid chromatography device according to the present disclosure.

FIG. 1 is a graph illustrating the operation of a mutually independent dual online liquid chromatography device according to the present disclosure, FIG. 2 is a graph illustrating the improved separation performance of hydrophilic samples by the mutually independent dual online liquid chromatography device according to the present disclosure, and FIGS. 3 to 11 are operational diagrams of a mutually independent dual online liquid chromatography device according to the present disclosure.

Referring to FIGS. 1 to 11, the mutually independent dual online liquid chromatography device 100 according to the present disclosure includes a first pump P1 to inject a first solvent or a mixed solution containing the first solvent and a second solvent, a second pump P2 to inject the first solvent or the mixed solution containing the first solvent and the second solvent, a sample inlet valve 110 to which the first pump P1 and a sample injector S configured to inject a sample are connected, a first column valve 150 to which a first reverse phase liquid chromatography column (hereinafter referred to as a "first sample separation column COL1") is connected and including a first solid phase extraction column SPE1 which is connected to the first sample separation column COL1, a second column valve 170 to which a second reverse phase liquid chromatography column (hereinafter referred to as a "second sample separation column COL2") is connected and including a second solid phase extraction column SPE2 which is connected to the second sample separation column COL2, and a column selection valve 130 connected to the sample inlet valve 110, the first column valve 150 and the second column valve 170.

Each of the first pump P1 and the second pump P2 is a pump used to inject the first solvent or the mixed solution containing the first solvent and the second solvent, and the first solvent may be a hydrophilic solvent, for example, 0.1% formic acid in water, and the second solvent may be a hydrophobic solvent, for example, a solution containing 0.1% formic acid and 99.9% acetonitrile.

The sample inlet valve 110 serves to receive the sample from the sample injector S and store it in a sample storage loop 111, and then receive the first solvent from the first pump P1 and feed the sample stored in the sample storage loop 111 into the column selection valve 130.

The sample inlet valve 110 includes a 6-port automatic switching valve having 6 ports.

The sample inlet valve 110 includes a sample inlet port 112 connected to the sample injector S, a sample outlet port 113 disposed adjacent to the sample inlet port 112, a first pump connection port 116 connected to the first pump P1, a first outlet port 117 disposed adjacent to the first pump connection port 116 and connected to the column selection valve 130, and a first sample storage loop connection port 114 and a second sample storage loop connection port 115 to which two ends of the sample storage loop 111 are respectively connected.

In a state that the first sample storage loop connection port 114 and the second sample storage loop connection port 115 respectively connected to the two ends of the sample storage loop 111 are connected to the sample inlet port 112 and the sample outlet port 113, respectively, the sample is fed into the sample inlet port 112 and continuously stored in the sample storage loop 111 through the sample injector S.

Additionally, in a state that the first sample storage loop connection port 114 and the second sample storage loop connection port 115 are connected to the first pump connection port 116 and the first outlet port 117, respectively, the first solvent is injected into a first pump inlet port and the sample stored in the sample storage loop 111 is continuously fed into the column selection valve 130 through the first pump P1.

The column selection valve 130 serves to feed the sample fed from the sample inlet valve 110 into the first solid phase extraction column SPE1 and the first sample separation column COL1 connected in the first column valve 150, and the second solid phase extraction column SPE2 and the second sample separation column COL2 connected in the second column valve 170 as described below.

Additionally, the column selection valve 130 injects the sample fed from the sample inlet valve 110 onto any one of the first sample separation column COL1 and the second sample separation column COL2 to separate and analyze the sample in one sample separation column while allowing for column wash and equilibration, sample injection and desalting, and isocratic elution in the other sample separation column.

The column selection valve 130 includes a 4-port automatic switching valve having 4 ports.

The column selection valve 130 includes a first inlet port 131 connected to the first outlet port 117, a first column valve connection port 132 connected to the first column valve 150, a second column valve connection port 133 connected to the second column valve 170, and a second pump connection port 134 connected to the second pump P2.

The column selection valve 130 may be connected to each of the second pump P2 and the sample inlet valve 110 to which the first pump P1 is connected, to selectively introduce the first solvent or the sample or the mixed solution containing the first solvent and the second solvent together with the first solvent. The first solvent or the sample or the mixed solution containing the first solvent and the second solvent together with the first solvent introduced into the column selection valve 130 is fed into the first column valve 150 to allow for wash and equilibration, sample injection and desalting and isocratic elution and gradient elution of the first solid phase extraction column SPE1 and the first sample separation column COL1, and is also fed into the second column valve 170 to allow for wash and equilibration, sample injection and desalting and isocratic elution and gradient elution of the second solid phase extraction column SPE2 and the second sample separation column COL2.

That is, in a state that the first outlet port 117, the first inlet port 131 and the first column valve connection port 132 are connected, the column selection valve 130 allows for wash and equilibration, sample injection and desalting and isocratic elution and gradient elution of the first solid phase extraction column SPE1 and the first sample separation column COL1, and in a state that the first outlet port 117, the first inlet port 131 and the second column valve connection port 133 are connected, the column selection valve 130 allows for wash and equilibration, sample injection and desalting and isocratic elution and gradient elution of the second solid phase extraction column SPE2 and the second sample separation column COL2.

The first column valve 150 allows for sample injection and desalting of the first solid phase extraction column SPE1, injection of the sample injected onto the first solid phase extraction column SPE1 onto the first sample separation column COL1 through valve switching, and isocratic elution and gradient elution to separate and analyze the sample. Additionally, the second column valve 170 allows for sample injection and desalting of the second solid phase extraction column SPE2, injection of the sample injected onto the second solid phase extraction column SPE2 onto the second sample separation column COL2 through valve switching, and isocratic elution and gradient elution to separate and analyze the sample.

Each of the first column valve 150 and the second column valve 170 includes a 6-port automatic switching valve having 6 ports.

The first column valve 150 includes a first solid phase extraction column connection port 152 and a first solid phase extraction column transit port 153 connected to two ends of the first solid phase extraction column SPE1, respectively, a first solid phase extraction column inlet port 151 connected to the first column valve connection port 132 and selectively connected to the first solid phase extraction column connection port 152 and the first solid phase extraction column transit port 153, a first sample separation column connection port 154 connected to the first sample separation column COL1 and connected to or disconnected from the first solid phase extraction column connection port 152, a second outlet port 155 disposed adjacent to the first solid phase extraction column transit port 153 and connected to or disconnected from the first solid phase extraction column transit port 153, and a first column outlet port 156 disposed adjacent to the first sample separation column connection port 154 and selectively connected to the first sample separation column connection port 154 and the second outlet port 155.

The second column valve 170 includes a second solid phase extraction column connection port 172 and a second solid phase extraction column transit port 173 connected to two ends of the second solid phase extraction column SPE2, respectively, a second solid phase extraction column inlet port 171 connected to the second column valve connection port 133 and selectively connected to the second solid phase extraction column connection port 172 and the second solid phase extraction column transit port 173, a second sample separation column connection port 174 connected to the second sample separation column COL2 and connected to or disconnected from the second solid phase extraction column connection port 172, a third outlet port 175 disposed adjacent to the second solid phase extraction column transit port 173 and connected to or disconnected from the second solid phase extraction column transit port 173, and a second column outlet port 176 disposed adjacent to the second sample separation column connection port 174 and selectively connected to the second sample separation column connection port 174 and the third outlet port 175.

In this embodiment, the first column valve 150 and the second column valve 170 are separately provided to inject the sample onto any one of the first sample separation column COL1 and the second sample separation column COL2 while separating and analyzing the sample in the other one. Additionally, in this embodiment, each of the first column valve 150 and the second column valve 170 includes a 6-port automatic switching valve to allow for column wash and equilibration, sample injection, desalting and isocratic elution of any one of the first sample separation column COL1 and the second sample separation column COL2 while sample analysis is being conducted in the other one, impossible for the existing dual online liquid chromatography device to perform.

This embodiment performs wash and equilibration of the second sample separation column COL2 during the separation and analysis of the sample in the first sample separation column COL1, thereby achieving continuous analysis without the influence of the dead time needed to stop the mass spectrometer (MS) during the wash and equilibration of the column. Additionally, this embodiment allows for injection of the sample onto the second solid phase extraction column SPE2 during the separation and analysis of the sample in the first sample separation column COL1, thereby achieving continuous analysis without the influence of the dead time for sample injection.

Additionally, this embodiment allows for injection of the sample onto the second solid phase extraction column SPE2 during separation and analysis of the sample in the first sample separation column COL1 and then isocratic elution of the sample injected onto the second solid phase extraction column SPE2 from the second sample separation column COL2, so that separation and analysis in the second sample separation column COL2 starts as soon as separation and analysis in the first sample separation column COL1 ends, thereby minimizing the mass signal dead time of the mass spectrometer (MS) and improving the separation performance of hydrophilic peptides.

A method for controlling the separation and analysis of the sample using the mutually independent dual online liquid chromatography device 100 according to the present disclosure as described above will be described as follows.

Figure 3:
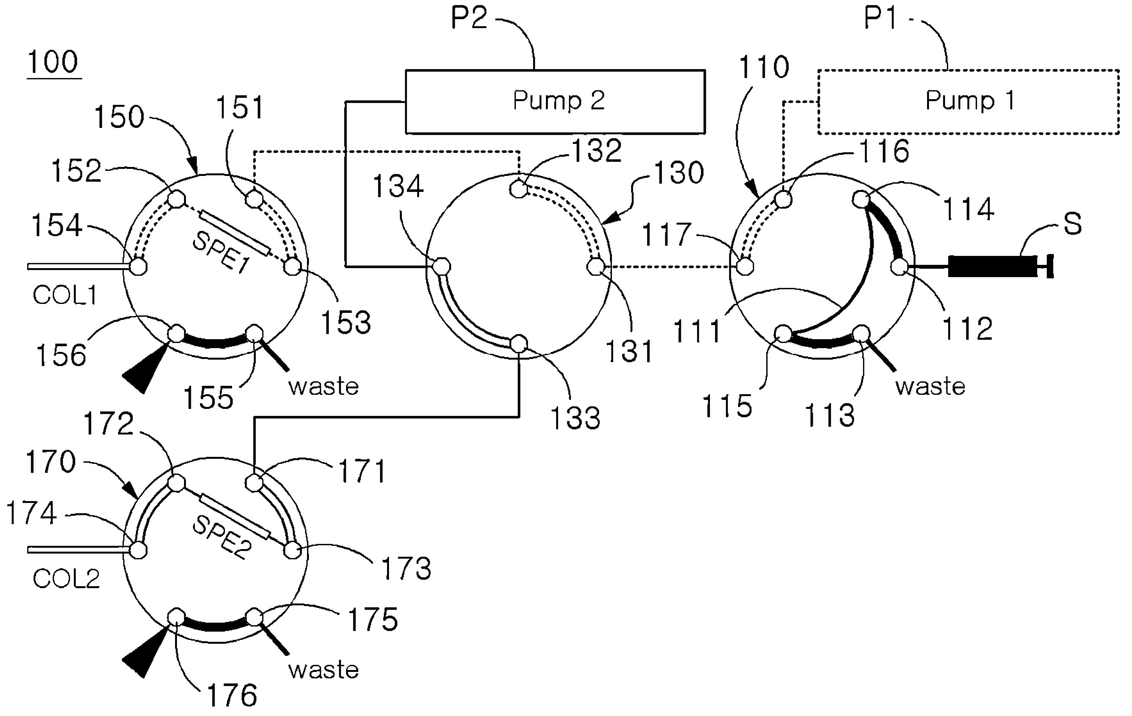
FIGS. 3 to 11 are operational diagrams of a mutually independent dual online liquid chromatography device according to the present disclosure.

Referring to FIG. 3, the method for controlling the mutually independent dual online liquid chromatography device 100 starts with initial mode operation.

In the initial mode, the sample is stored in the sample storage loop 111 of the sample inlet valve 110, and at the same time, equilibration is performed on the first solid phase extraction column SPE1 and the first sample separation column COL1 of the first column valve 150 and the second solid phase extraction column SPE2 and the second sample separation column COL2 of the second column valve 170.

That is, the sample injector S connected to the sample inlet valve 110 injects and stores the sample in the sample storage loop 111. In a state that the first sample storage loop connection port 114 and the second sample storage loop connection port 115 are connected to the sample inlet port 112 and the sample outlet port 113, respectively, the sample is fed from the sample injector S and injected and stored in the sample storage loop 111.

Additionally, the first pump P1 connected to the sample inlet valve 110 injects the first solvent onto the first solid phase extraction column SPE1 and the first sample separation column COL1 of the first column valve 150 via the column selection valve 130 to equilibrate the first solid phase extraction column SPE1 and the first sample separation column COL1. Specifically, in a state that the first pump connection port 116 and the first outlet port 117 are connected, the first pump P1 feeds the first solvent into the column selection valve 130. Additionally, in a state that the first inlet port 131 and the first column valve connection port 132 are connected, the first solvent fed into the column selection valve 130 is fed into the first column valve 150. Additionally, in a state that the first solid phase extraction column inlet port 151 and the first solid phase extraction column transit port 153 are connected and the first solid phase extraction column connection port 152 and the first sample separation column connection port 154 are connected, the first solvent fed into the first column valve 150 is injected onto the first solid phase extraction column SPE1 and the first sample separation column COL1 to equilibrate the first solid phase extraction column SPE1 and the first sample separation column COL1.

Additionally, the second pump P2 connected to the column selection valve 130 injects the first solvent onto the second solid phase extraction column SPE2 and the second sample separation column COL2 of the second column valve 170 to equilibrate the second solid phase extraction column SPE2 and the second sample separation column COL2. Specifically, in a state that the second pump connection port 134 and the second column valve connection port 133 are connected, the second pump P2 feeds the first solvent into the second column valve 170. Additionally, in a state that the second solid phase extraction column inlet port 171 and the second solid phase extraction column transit port 173 are connected and the second solid phase extraction column connection port 172 and the second sample separation column connection port 174 are connected, the first solvent fed into the second column valve 170 is injected onto the second solid phase extraction column SPE2 and the second sample separation column COL2 to equilibrate the second solid phase extraction column SPE2 and the second sample separation column COL2.

Figure 4:
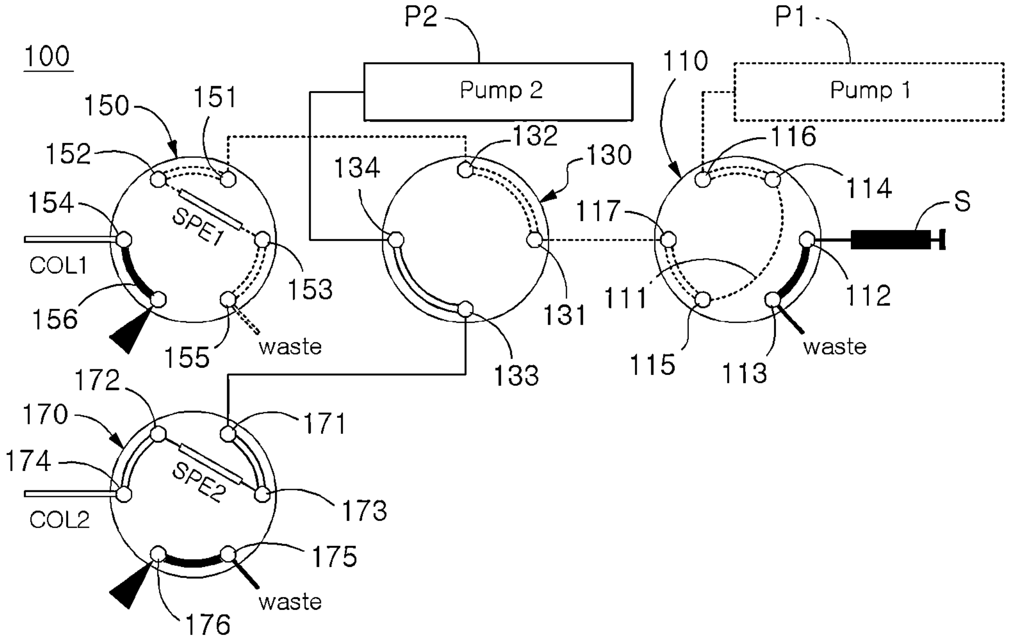

Additionally, after the initial mode, referring to FIG. 4, the method for controlling the mutually independent dual online liquid chromatography device 100 carries out a first mode.

In the first mode, during injection of the sample stored in the sample storage loop 111 onto the first solid phase extraction column SPE1 and desalting and concentrating, the second solid phase extraction column SPE2 and the second sample separation column COL2 are continuously equilibrated.

That is, in a state that the first solid phase extraction column inlet port 151 and the first solid phase extraction column connection port 152 are connected and the first solid phase extraction column transit port 153 and the second outlet port 155 are connected, the sample stored in the sample storage loop 111 is injected onto the first solid phase extraction column SPE1 together with the first solvent fed from the first pump P1, and is desalted and concentrated. Specifically, in a state that the first pump connection port 116 and the first sample storage loop connection port 114 are connected and the second sample storage loop connection port 115 and the first outlet port 117 are connected, the sample stored in the sample storage loop 111 is fed into the column selection valve 130 together with the first solvent fed from the first pump P1. Additionally, in a state that the first inlet port 131 and the first column valve connection port 132 are connected, the first solvent and the sample fed into the column selection valve 130 are fed into the first column valve 150. Additionally, in a state that the first solid phase extraction column inlet port 151 and the first solid phase extraction column connection port 152 are connected and the first solid phase extraction column transit port 153 and the second outlet port 155 are connected, the first solvent and the sample fed into the first column valve 150 are injected onto the first solid phase extraction column SPE1. Additionally, the sample is desalted and concentrated in the first solid phase extraction column SPE1 by additionally injecting the first solvent, for example, in an amount of about 2 μL to cause salts to melt in the first solvent which is a water-soluble solvent and exit the second outlet port 155.

Additionally, in a state that the second solid phase extraction column inlet port 171 and the second solid phase extraction column transit port 173 are connected and the second solid phase extraction column connection port 172 and the second sample separation column connection port 174 are connected, the second pump P2 injects the first solvent onto the second solid phase extraction column SPE2 and the second sample separation column COL2 to continuously equilibrate the second solid phase extraction column SPE2 and the second sample separation column COL2. Specifically, in a state that the second pump connection port 134 and the second column valve connection port 133 are connected, the second pump P2 feeds the first solvent into the second column valve 170. Additionally, in a state that the second solid phase extraction column inlet port 171 and the second solid phase extraction column transit port 173 are connected and the second solid phase extraction column connection port 172 and the second sample separation column connection port 174 are connected, the first solvent fed into the second column valve 170 is injected onto the second solid phase extraction column SPE2 and the second sample separation column COL2 to continuously equilibrate the second solid phase extraction column SPE2 and the second sample separation column COL2.

Figure 5:
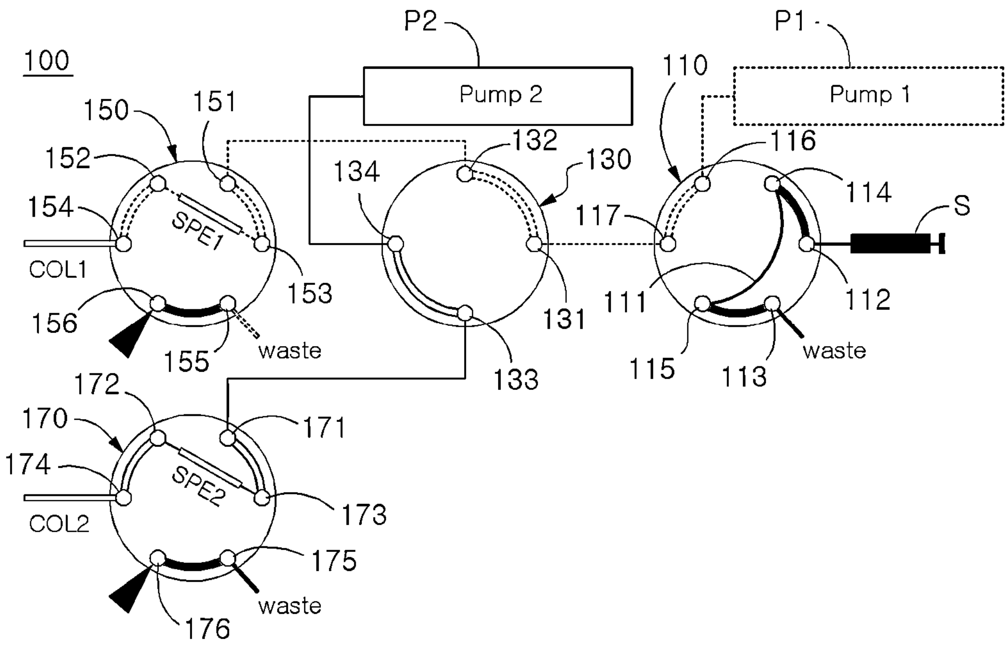

Additionally, after the first mode, referring to FIG. 5, the method for controlling the mutually independent dual online liquid chromatography device 100 carries out a second mode.

In the second mode, during isocratic elution from the first solid phase extraction column SPE1 and the first sample separation column COL1, the second solid phase extraction column SPE2 and the second sample separation column COL2 are continuously equilibrated.

That is, in a state that the first solid phase extraction column inlet port 151 and the first solid phase extraction column transit port 153 are connected and the first solid phase extraction column connection port 152 and the first sample separation column connection port 154 are connected, the first pump P1 injects the mixed solution containing the first solvent and the second solvent onto the first solid phase extraction column SPE1 and the first sample separation column COL1 to perform isocratic elution. The mixed solution used in the isocratic elution may be a mixture of 90% the first solvent and 10% the second solvent, but the scope of protection of the present disclosure is not limited thereto and the mixed solution used in the isocratic elution may have varying ratios of the first solvent and the second solvent as necessary.

Specifically, in a state that the first pump connection port 116 and the first outlet port 117 are connected, the first pump P1 feeds the mixed solution containing the first solvent and the second solvent into the column selection valve 130. Additionally, in a state that the first inlet port 131 and the first column valve connection port 132 are connected, the mixed solution containing the first solvent and the second solvent fed into the column selection valve 130 is fed into the first column valve 150. Additionally, in a state that the first solid phase extraction column inlet port 151 and the first solid phase extraction column transit port 153 are connected and the first solid phase extraction column connection port 152 and the first sample separation column connection port 154 are connected, the mixed solution containing the first solvent and the second solvent fed into the first column valve 150 is injected onto the first solid phase extraction column SPE1 and the first sample separation column COL1 to perform isocratic elution.

The dissociation level of the sample injected onto the first solid phase extraction column SPE1 increases by the isocratic elution, and the dissociated hydrophilic peptide is introduced into the first sample separation column COL1. The isocratic elution process is performed for the time required for the first peptide to go from the first sample separation column COL1 until immediately before the mass spectrometer (MS). Accordingly, since a data collection signal is sent to the mass spectrometer (MS) immediately before the first peptide is eluted from the first sample separation column COL1 by the mass spectrometer (MS), it is possible to minimize the mass signal dead time during which any peptide is not detected in the mass spectrometer (MS). Additionally, as shown in FIG. 2, it is possible to maximize the reverse phase chromatography separation space of hydrophilic peptides by the isocratic elution.

Additionally, in a state that the second solid phase extraction column inlet port 171 and the second solid phase extraction column transit port 173 are connected and the second solid phase extraction column connection port 172 and the second sample separation column connection port 174 are connected, the second pump P2 injects the first solvent onto the second solid phase extraction column SPE2 and the second sample separation column COL2 to continuously equilibrate the second solid phase extraction column SPE2 and the second sample separation column COL2. Specifically, in a state that the second pump connection port 134 and the second column valve connection port 133 are connected, the second pump P2 feeds the first solvent into the second column valve 170.

Additionally, in a state that the second solid phase extraction column inlet port 171 and the second solid phase extraction column transit port 173 are connected and the second solid phase extraction column connection port 172 and the second sample separation column connection port 174 are connected, the first solvent fed into the second column valve 170 is injected onto the second solid phase extraction column SPE2 and the second sample separation column COL2 to continuously equilibrate the second solid phase extraction column SPE2 and the second sample separation column COL2.

Figure 6:
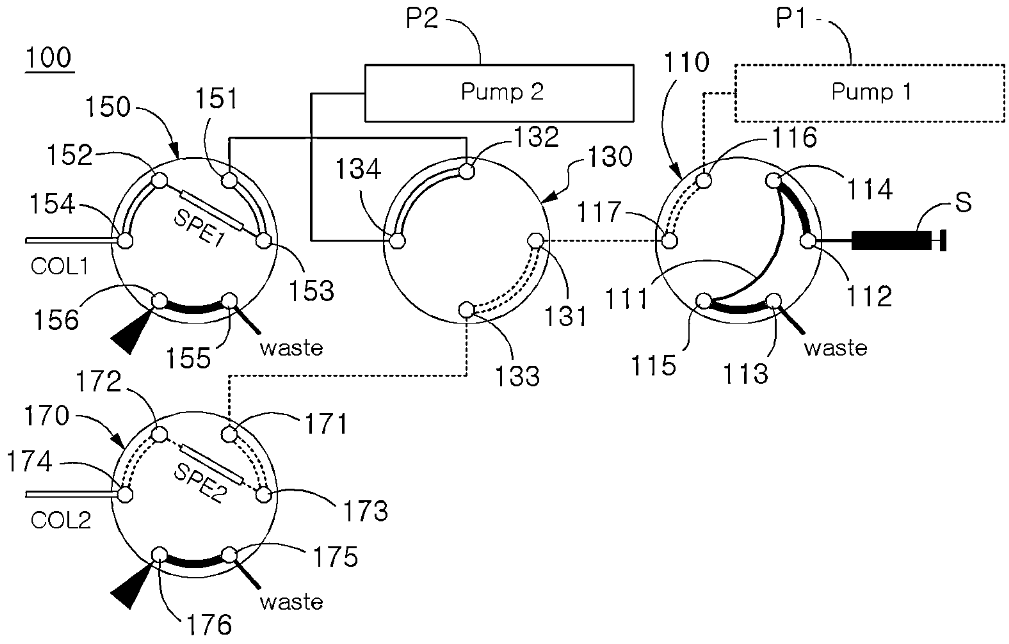
Figure 7:
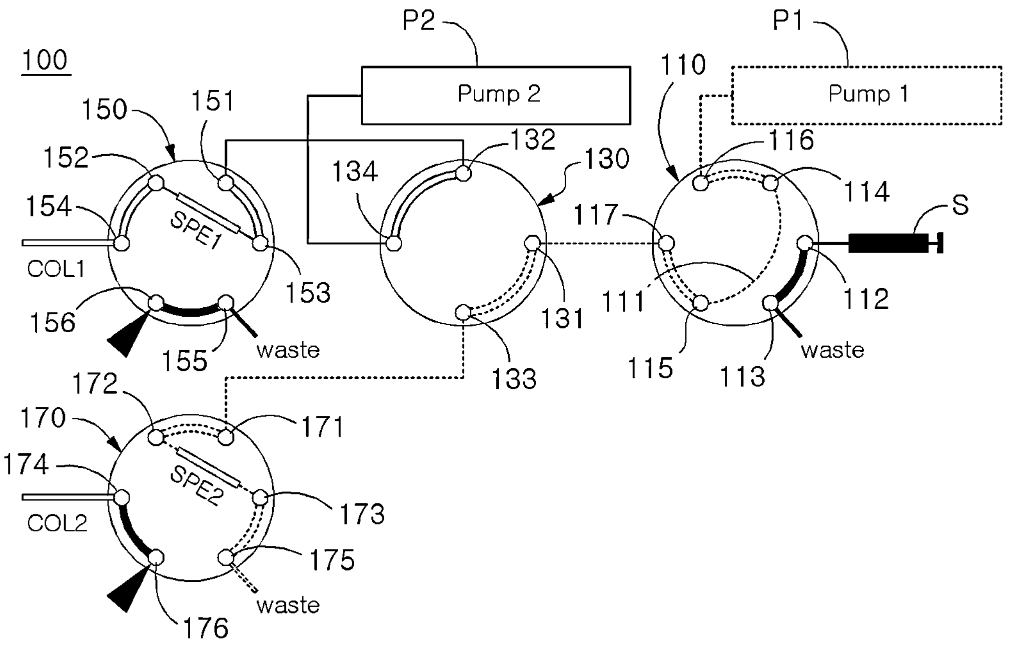
Figure 8:
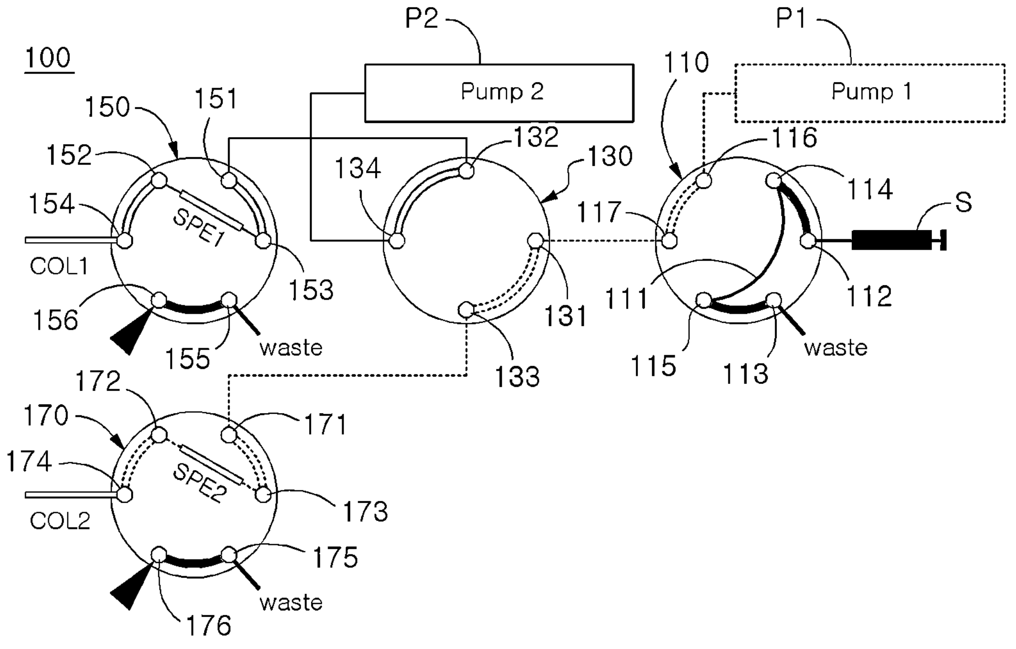

Additionally, after the second mode, referring to FIGS. 6 to 8, the method for controlling the mutually independent dual online liquid chromatography device 100 carries out a third mode.

In the third mode, during gradient elution from the first sample separation column COL1 and separation and analysis of the sample, equilibration of the second solid phase extraction column SPE2 and the second sample separation column COL2, sample injection and isocratic elution are performed.

That is, when the isocratic elution from the first solid phase extraction column SPE1 and the first sample separation column COL1 is completed, the second pump P2 feeds the mixed solution containing the increasing second solvent over time into the first solid phase extraction column SPE1 and the first sample separation column COL1 to perform gradient elution and separation and analysis of the sample, and at the same time, the first pump P1 injects the first solvent onto the second solid phase extraction column SPE2 and the second sample separation column COL2 to continuously equilibrate the second solid phase extraction column SPE2 and the second sample separation column COL2 and stores the sample in the sample storage loop 111.

Specifically, as shown in FIG. 6, in a state that the second pump connection port 134 and the first column valve connection port 132 are connected, the second pump P2 feeds the mixed solution containing the first solvent and the second solvent into the first column valve 150. Additionally, in a state that the first solid phase extraction column inlet port 151 and the first solid phase extraction column transit port 153 are connected and the first solid phase extraction column connection port 152 and the first sample separation column connection port 154 are connected, the mixed solution fed into the first column valve 150 is injected onto the first solid phase extraction column SPE1 and the first sample separation column COL1 to perform gradient elution and separation and analysis of the sample. As shown in FIG. 1, the gradient elution is performed with varying ratios of the first solvent and the second solvent in the mixed solution containing the first solvent and the second solvent over time using the second pump P2. That is, the initial condition of the mixed solution starts from 90% the first solvent and 10% the second solvent in the same way as the isocratic elution condition, and as the dissociation level of the sample increases with the increasing proportion of the second solvent in the mixed solution, the sample injected onto the first solid phase extraction column SPE1 is introduced into the first sample separation column COL1, and subsequently, analysis is conducted through separation of the sample. In this instance, the composition of the mixed solution used in the gradient elution may be subject to change depending on the isocratic elution conditions.

Additionally, in a state that the first pump connection port 116 and the first outlet port 117 are connected, the first pump P1 feeds the first solvent into the column selection valve 130. Additionally, in a state that the first inlet port 131 and the second column valve connection port 133 are connected, the first solvent fed into the column selection valve 130 is fed into the second column valve 170. Additionally, in a state that the second solid phase extraction column inlet port 171 and the second solid phase extraction column transit port 173 are connected and the second solid phase extraction column connection port 172 and the second sample separation column connection port 174 are connected, the first solvent fed into the second column valve 170 is injected onto the second solid phase extraction column SPE2 and the second sample separation column COL2 to continuously equilibrate the second solid phase extraction column SPE2 and the second sample separation column COL2.

Additionally, in a state that the first sample storage loop connection port 114 and the second sample storage loop connection port 115 are connected to the sample inlet port 112 and the sample outlet port 113, respectively, the sample is fed from the sample injector S and injected and stored in the sample storage loop 111.

Additionally, during separation and analysis of the sample in the first sample separation column COL1, the first pump P1 injects the first solvent onto the sample storage loop 111 to inject the sample stored in the sample storage loop 111 onto the second solid phase extraction column SPE2 and desalt and concentrate the sample.

That is, as shown in FIG. 7, in a state that the second solid phase extraction column inlet port 171 and the second solid phase extraction column connection port 172 are connected and the second solid phase extraction column transit port 173 and the third outlet port 175 are connected, the sample stored in the sample storage loop 111 is injected onto the second solid phase extraction column SPE2 together with the first solvent fed from the first pump P1, and is desalted and concentrated. Specifically, in a state that the first pump connection port 116 and the first sample storage loop connection port 114 are connected and the second sample storage loop connection port 115 and the first outlet port 117 are connected, the sample stored in the sample storage loop 111 is fed into the column selection valve 130 together with the first solvent fed from the first pump P1. Additionally, in a state that the first inlet port 131 and the second column valve connection port 133 are connected, the first solvent and the sample fed into the column selection valve 130 is fed into the second column valve 170. Additionally, in a state that the second solid phase extraction column inlet port 171 and the second solid phase extraction column connection port 172 are connected and the second solid phase extraction column transit port 173 and the third outlet port 175 are connected, the first solvent and the sample fed into the second column valve 170 is injected onto the second solid phase extraction column SPE2. Additionally, the sample is desalted and concentrated in the second solid phase extraction column SPE2 by additionally injecting the first solvent, for example, in an amount of about 2 μL to cause salts to melt in the first solvent which is a water-soluble solvent and exit the third outlet port 175.

Additionally, during separation analysis of the sample in the first sample separation column COL1, the first pump P1 injects the mixed solution containing the first solvent and the second solvent onto the second solid phase extraction column SPE2 and the second sample separation column COL2 to perform isocratic elution.

Specifically, as shown in FIG. 8, in a state that the first pump connection port 116 and the first outlet port 117 are connected, the first pump P1 feeds the mixed solution containing the first solvent and the second solvent into the column selection valve 130. Additionally, in a state that the first inlet port 131 and the second column valve connection port 133 are connected, the mixed solution containing the first solvent and the second solvent fed into the column selection valve 130 is fed into the second column valve 170. Additionally, in a state that the second solid phase extraction column inlet port 171 and the second solid phase extraction column transit port 173 are connected and the second solid phase extraction column connection port 172 and the second sample separation column connection port 174 are connected, the mixed solution containing the first solvent and the second solvent fed into the second column valve 170 is injected onto the second solid phase extraction column SPE2 and the second sample separation column COL2 to perform isocratic elution.

Additionally, after the third mode, referring to FIG. 8, the method for controlling the mutually independent dual online liquid chromatography device 100 carries out a fourth mode.

In the fourth mode, separation and analysis of the sample in the first sample separation column COL1 and isocratic elution from the second solid phase extraction column SPE2 and the second sample separation column COL2 are completed at the same time.

The end time of separation and analysis of the sample in the first sample separation column COL1 and the time immediately before the first peptide is eluted from the second sample separation column COL2 are matched to each other so that separation and analysis in the second sample separation column COL2 starts as soon as separation and analysis in the first sample separation column COL1 ends, thereby minimizing the mass signal dead time of the mass spectrometer (MS).

Figure 9:
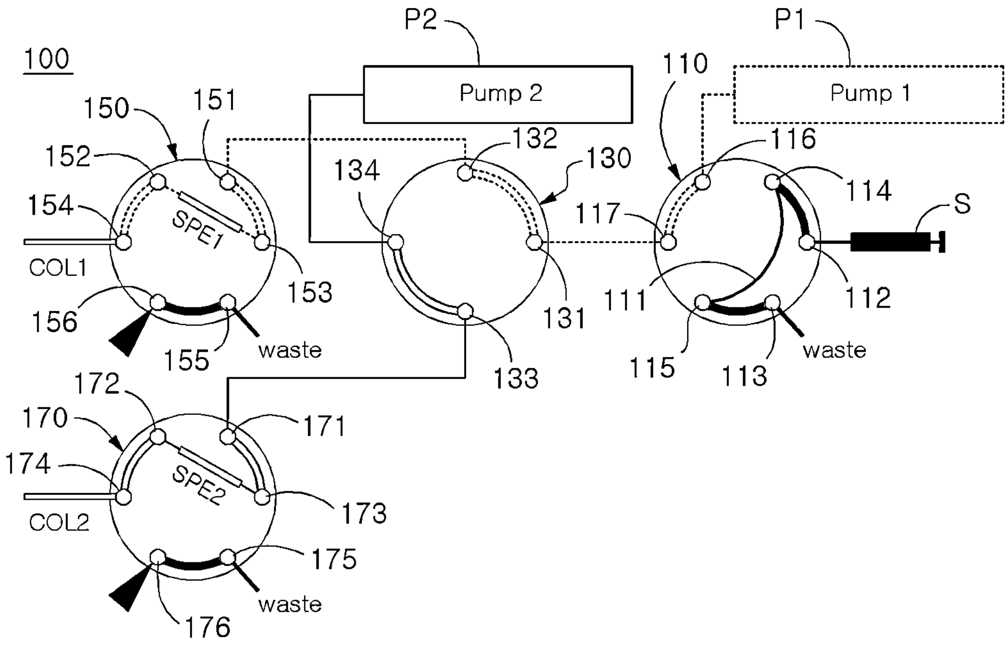

Additionally, after the fourth mode, referring to FIG. 9, the method for controlling the mutually independent dual online liquid chromatography device 100 carries out a fifth mode.

In the fifth mode, during gradient elution from the second solid phase extraction column SPE2 and the second sample separation column COL2 and separation and analysis of the sample, wash and equilibration, sample injection and isocratic elution of the first solid phase extraction column SPE1 and the first sample separation column COL1 are performed.

That is, when the isocratic elution from the second solid phase extraction column SPE2 and the second sample separation column COL2 is completed, the second pump P2 feeds the mixed solution containing the increasing second solvent over time into the second solid phase extraction column SPE2 and the second sample separation column COL2 to perform gradient elution and separation and analysis of the sample, and at the same time, the first pump P1 feeds the first solvent into the first solid phase extraction column SPE1 and the first sample separation column COL1 to continuously equilibrate the first solid phase extraction column SPE1 and the first sample separation column COL1, and store the sample in the sample storage loop 111. On the other hand, before the equilibration of the first solid phase extraction column SPE1 and the first sample separation column COL1, the washing process of the first solid phase extraction column SPE1 and the first sample separation column COL1 may be performed for a short time using the mixed solution containing 20% the first solvent and 80% the second solvent, and the washing process of the first solid phase extraction column SPE1 and the first sample separation column COL1 may be performed repeatedly multiple times (see FIG. 1).

Specifically, as shown in FIG. 9, in a state that the second pump connection port 134 and the second column valve connection port 133 are connected, the second pump P2 feeds the mixed solution containing the first solvent and the second solvent into the second column valve 170. Additionally, in a state that the second solid phase extraction column inlet port 171 and the second solid phase extraction column transit port 173 are connected and the second solid phase extraction column connection port 172 and the second sample separation column connection port 174 are connected, the mixed solution fed into the second column valve

170 is injected onto the second solid phase extraction column SPE2 and the second sample separation column COL2 to perform gradient elution and separation and analysis of the sample. As shown in FIG. 1, the gradient elution is performed with varying ratios of the first solvent and the second solvent in the mixed solution containing the first solvent and the second solvent over time using the second pump P2. That is, the initial condition of the mixed solution starts from 90% the first solvent and 10% the second solvent in the same way as the isocratic elution condition, and as the dissociation level of the sample increases with the increasing proportion of the second solvent in the mixed solution, the sample injected onto the second solid phase extraction column SPE2 is introduced into the second sample separation column COL2, and subsequently, analysis is conducted through separation of the sample. In this instance, the composition of the mixed solution used in the gradient elution may be subject to change depending on the isocratic elution conditions.

Additionally, in a state that the first pump connection port 116 and the first outlet port 117 are connected, the first pump P1 feeds the first solvent into the column selection valve 130. Additionally, in a state that the first inlet port 131 and the first column valve connection port 132 are connected, the first solvent fed into the column selection valve 130 is fed into the first column valve 150. Additionally, in a state that the first solid phase extraction column inlet port 151 and the first solid phase extraction column transit port 153 are connected and the first solid phase extraction column connection port 152 and the first sample separation column connection port 154 are connected, the first solvent fed into the first column valve 150 is injected onto the first solid phase extraction column SPE1 and the first sample separation column COL1 to continuously equilibrate the first solid phase extraction column SPE1 and the first sample separation column COL1.

Additionally, in a state that the first sample storage loop connection port 114 and the second sample storage loop connection port 115 are connected to the sample inlet port 112 and the sample outlet port 113, respectively, the sample is fed from the sample injector S and injected and stored in the sample storage loop 111.

Additionally, during separation and analysis of the sample in the second sample separation column COL2, the first pump P1 feeds the first solvent into the sample storage loop 111 to inject the sample stored in the sample storage loop 111 onto the first solid phase extraction column and desalt and concentrate the sample.

Figure 10:
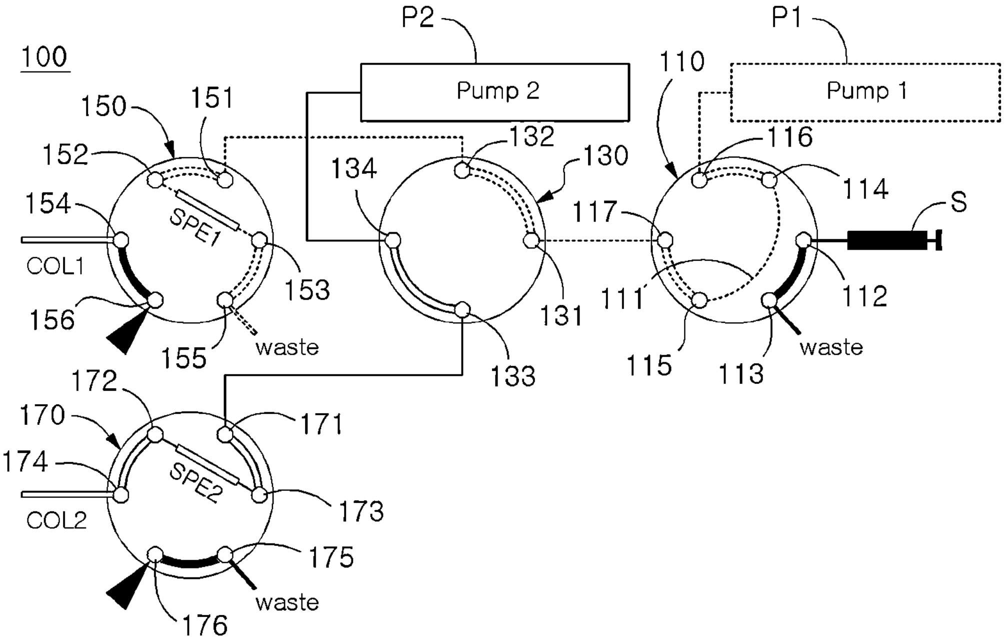

That is, as shown in FIG. 10, in a state that the first solid phase extraction column inlet port 151 and the first solid phase extraction column connection port 152 are connected and the first solid phase extraction column transit port 153 and the second outlet port 155 are connected, the sample stored in the sample storage loop 111 is injected onto the first solid phase extraction column SPE1 together with the first solvent fed from the first pump P1, and is desalted and concentrated. Specifically, in a state that the first pump connection port 116 and the first sample storage loop connection port 114 are connected and the second sample storage loop connection port 115 and the first outlet port 117 are connected, the sample stored in the sample storage loop 111 is fed into the column selection valve 130 together with the first solvent fed from the first pump P1. Additionally, in a state that the first inlet port 131 and the first column valve connection port 132 are connected, the first solvent and the sample fed into the column selection valve 130 are fed into the first column valve 150. Additionally, in a state that the first solid phase extraction column inlet port 151 and the first solid phase extraction column connection port 152 are connected and the first solid phase extraction column transit port 153 and the second outlet port 155 are connected, the first solvent and the sample fed into the first column valve 150 are injected onto the first solid phase extraction column SPE1. Additionally, the sample is desalted and concentrated in the first solid phase extraction column SPE1 by additionally injecting the first solvent, for example, in an amount of about 2 μL to cause salts to melt in the first solvent which is a water-soluble solvent and exit the second outlet port 155.

Additionally, during separation and analysis of the sample in the second sample separation column COL2, the first pump P1 injects the mixed solution containing the first solvent and the second solvent onto the first solid phase extraction column SPE1 and the first sample separation column COL1 to perform isocratic elution.

Figure 11:
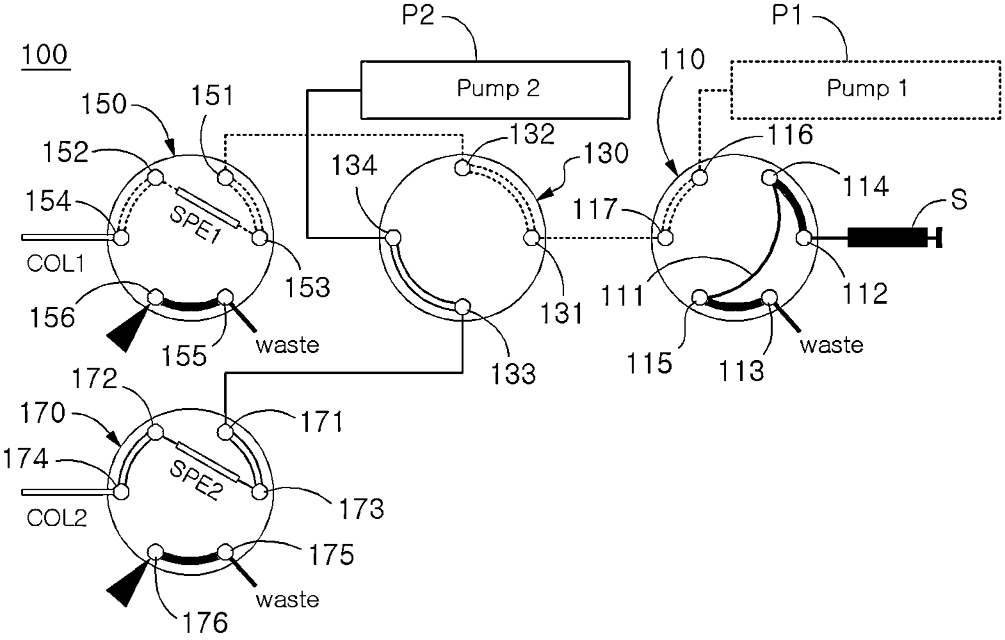

Specifically, as shown in FIG. 11, in a state that the first pump connection port 116 and the first outlet port 117 are connected, the first pump P1 feeds the mixed solution containing the first solvent and the second solvent into the column selection valve 130. Additionally, in a state that the first inlet port 131 and the first column valve connection port 132 are connected, the mixed solution containing the first solvent and the second solvent fed into the column selection valve 130 is fed into the first column valve 150. Additionally, in a state that the first solid phase extraction column inlet port 151 and the first solid phase extraction column transit port 153 are connected and the first solid phase extraction column connection port 152 and the first sample separation column connection port 154 are connected, the mixed solution containing the first solvent and the second solvent fed into the first column valve 150 is injected onto the first solid phase extraction column SPE1 and the first sample separation column COL1 to perform isocratic elution.

Additionally, after the fifth mode, referring to FIG. 11, the method for controlling the mutually independent dual online liquid chromatography device 100 carries out a sixth mode.

In the sixth mode, separation and analysis of the sample in the second sample separation column COL2 and isocratic elution from the first solid phase extraction column SPE1 and the first sample separation column COL1 are completed at the same time.

The end time of separation analysis of the sample in the second sample separation column COL2 and the time immediately before the first peptide is eluted from the first sample separation column COL1 are matched to each other so that separation and analysis in the first sample separation column COL1 starts as soon as separation and analysis in the second sample separation column COL2 ends, thereby minimizing the mass signal dead time of the mass spectrometer (MS).

Additionally, after the sixth mode, the method for controlling the mutually independent dual online liquid chromatography device 100 may carry out the third to sixth modes in a sequential order repeatedly according to the number of times of separation and analysis of the sample or the number of samples.

In this instance, in the third mode, before the equilibration of the second solid phase extraction column SPE2 and the second sample separation column COL2, the washing process of the second solid phase extraction column SPE2 and the second sample separation column COL2 may be additionally performed for a short time using the mixed solution containing 20% the first solvent and 80% the second solvent, and the washing process of the second solid phase extraction column SPE2 and the second sample separation column COL2 may be performed repeatedly multiple times (see FIGS. 1 and 6).

As described above, since the method for controlling the mutually independent dual online liquid chromatography device 100 may iteratively carry out the third to sixth modes according to the number of times of separation and analysis of the sample or the number of samples, it is possible to improve the efficiency of separation and analysis without the influence of the dead time.

Additionally, since the method for controlling the mutually independent dual online liquid chromatography device 100 according to the present disclosure adds the isocratic elution process, it is possible to minimize the mass signal dead time during which peptide is not detected in the mass spectrometer (MS) and improve the separation performance of hydrophilic peptides.

The present disclosure is not limited to the disclosed embodiments, and it is obvious to those skilled in the art that various modifications and changes may be made thereto without departing from the spirit and scope of the present disclosure. Accordingly, it should be understood that such modifications or changes fall within the scope of protection of the present disclosure.

DETAILED DESCRIPTION OF MAIN ELEMENTS

100: Dual online liquid chromatography device
110: Sample inlet valve
111: Sample storage loop
112: Sample inlet port
113: Sample outlet port
114: First sample storage loop connection port
115: Second sample storage loop connection port
116: First pump connection port
117: First outlet port
130: Column selection valve
131: First inlet port
132: First column valve connection port
133: Second column valve connection port
134: Second pump connection port
150: First column valve
COL1: First sample separation column
SPE1: First solid phase extraction column
151: First solid phase extraction column inlet port
152: First solid phase extraction column connection port
153: First solid phase extraction column transit port
154: First sample separation column connection port
155: Second outlet port
156: First column outlet port
170: Second column valve
COL2: Second sample separation column
SPE2: Second solid phase extraction column
171: Second solid phase extraction column inlet port
172: Second solid phase extraction column connection port
173: Second solid phase extraction column transit port
174: Second sample separation column connection port
175: Third outlet port
176: Second column outlet port
P1: First pump
P2: Second pump
S: Sample injector

What is claimed is:

1. A method for controlling a mutually independent dual online liquid chromatography device, comprising:

(A) injecting, by a sample injector(S) connected to a sample inlet valve (110), a sample onto a sample storage loop (111) of the sample inlet valve (110) to store the sample, and at the same time injecting, by a first pump (P1) connected to the sample inlet valve (110), a first solvent onto a first solid phase extraction column (SPE1) and a first sample separation column (COL1) of a first column valve (150) via the sample inlet valve (110) and a column selection valve (130) to equilibrate the first solid phase extraction column (SPE1) and the first sample separation column (COL1), and injecting, by a second pump (P2) connected to the column selection valve (130), the first solvent onto a second solid phase extraction column (SPE2) and a second sample separation column (COL2) of a second column valve (170) via the column selection valve (130) to equilibrate the second solid phase extraction column (SPE2) and the second sample separation column (COL2);

(B) performing valve switching on the sample inlet valve (110) and the first column valve (150) to inject the sample stored in the sample storage loop (111) onto the first solid phase extraction column (SPE1) via the column selection valve (130) together with the first solvent fed from the first pump (P1), and desalting and concentrating the sample, and at the same time injecting, by the second pump (P2), the first solvent onto the second solid phase extraction column (SPE2) and the second sample separation column (COL2) via the column selection valve (130) to continuously equilibrate the second solid phase extraction column (SPE2) and the second sample separation column (COL2);

(C) performing valve switching on the sample inlet valve (110) and the first column valve (150) again, injecting, by the first pump (P1), a mixed solution of the first solvent and a second solvent onto the first solid phase extraction column (SPE1) and the first sample separation column (COL1) via the sample inlet valve (110) and the column selection valve (130) to perform isocratic elution, and at the same time injecting, by the second pump (P2), the first solvent onto the second solid phase extraction column (SPE2) and the second sample separation column (COL2) via the column selection valve (130) to continuously equilibrate the second solid phase extraction column (SPE2) and the second sample separation column (COL2);

(D) performing valve switching of the column selection valve (130) to inject, by the second pump (P2), the mixed solution containing the increasing second solvent over time onto the first solid phase extraction column (SPE1) and the first sample separation column (COL1) via the column selection valve (130) to perform gradient elution for separation and analysis of the sample, and at the same time injecting, by the first pump (P1), the first solvent onto the second solid phase extraction column (SPE2) and the second sample separation column (COL2) via the sample inlet valve (110) and the column selection valve (130) to continuously equilibrate the second solid phase extraction column (SPE2) and the second sample separation column (COL2);

(E) during the separation and analysis of the sample by the gradient elution in the first sample separation column (COL1), injecting, by the sample injector(S), the sample onto the sample storage loop (111) to store the sample, and at the same time injecting, by the first pump (P1) connected to the sample inlet valve (110), the first solvent onto the second solid phase extraction column (SPE2) and the second sample separation column (COL2) of the second column valve (170) via the sample inlet valve (110) and the column selection valve (130) to continuously equilibrate the second solid phase extraction column (SPE2) and the second sample separation column (COL2);

(F) during the separation and analysis of the sample by the gradient elution in the first sample separation column (COL1), performing valve switching on the sample inlet valve (110) and the second column valve (170), injecting the sample stored in the sample storage loop (111) onto the second solid phase extraction column (SPE2) via the sample inlet valve (110) and the column selection valve (130) together with the first solvent fed from the first pump (P1), and desalting and concentrating the sample;

(G) during the separation and analysis of the sample by the gradient elution in the first sample separation column (COL1), performing valve switching on the sample inlet valve (110) and the second column valve (170) and injecting, by the first pump (P1), the mixed solution of the first solvent and the second solvent onto the second solid phase extraction column (SPE2) and the second sample separation column (COL2) via the sample inlet valve (110) and the column selection valve (130) to perform isocratic elution;

(H) completing the separation and analysis of the sample in the first sample separation column (COL1) and the isocratic elution from the second solid phase extraction column (SPE2) and the second sample separation column (COL2) at the same time;

(I) performing valve switching of the column selection valve (130) to inject, by the second pump (P2), the mixed solution containing the increasing second solvent over time onto the second solid phase extraction column (SPE2) and the second sample separation column (COL2) via the column selection valve (130) to perform gradient elution for separation and analysis of the sample, and at the same time injecting, by the first pump (P1), the mixed solution containing the first solvent and the second solvent onto the first solid phase extraction column (SPE1) and the first sample separation column (COL1) via the sample inlet valve (110) and the column selection valve (130) to wash the first solid phase extraction column (SPE1) and the first sample separation column (COL1);

(J) during the separation and analysis of the sample by the gradient elution in the second sample separation column (COL2), injecting, by the first pump (P1), the first solvent onto the first solid phase extraction column (SPE1) and the first sample separation column (COL1) via the sample inlet valve (110) and the column selection valve (130) to equilibrate the first solid phase extraction column (SPE1) and the first sample separation column (COL1);

(K) during the separation and analysis of the sample by the gradient elution in the second sample separation column (COL2), injecting, by the sample injector(S), the sample onto the sample storage loop (111) to store the sample, and at the same time injecting, by the first pump (P1) connected to the sample inlet valve (110), the first solvent onto the first solid phase extraction column (SPE1) and the first sample separation column (COL1) of the first column valve (150) via the sample inlet valve (110) and the column selection valve (130) to continuously equilibrate the first solid phase extraction column (SPE1) and the first sample separation column (COL1);

(L) during the separation and analysis of the sample by the gradient elution in the second sample separation column (COL2), performing valve switching on the sample inlet valve (110) and the first column valve (150) to inject the sample stored in the sample storage loop (111) onto the first solid phase extraction column (SPE1) via the sample inlet valve (110) and the column selection valve (130) together with the first solvent fed from the first pump (P1), and desalting and concentrating the sample;

(M) during the separation and analysis of the sample by the gradient elution in the second sample separation column (COL2), performing valve switching on the sample inlet valve (110) and the first column valve (150), and injecting, by the first pump (P1), the mixed solution of the first solvent and the second solvent onto the first solid phase extraction column (SPE1) and the first sample separation column (COL1) via the sample inlet valve (110) and the column selection valve (130) to perform isocratic elution;

(N) completing the separation and analysis of the sample in the second sample separation column (COL2) and the isocratic elution from the first solid phase extraction column (SPE1) and the first sample separation column (COL1) at the same time; and (O) performing the steps (D) to (N) in a sequential order repeatedly according to the number of times of separation and analysis of the sample or the number of samples.

2. The method for controlling a mutually independent dual online liquid chromatography device according to claim 1, wherein the sample inlet valve (110) includes:

a sample inlet port (112) connected to the sample injector (S);

a sample outlet port (113) disposed adjacent to the sample inlet port (112);

a first pump connection port (116) connected to the first pump (P1);

a first outlet port (117) disposed adjacent to the first pump connection port (116) and connected to the column selection valve (130); and a first sample storage loop connection port (114) and a second sample storage loop connection port (115) to which two ends of the sample storage loop (111) are connected respectively, wherein the column selection valve (130) includes:

a first inlet port (131) connected to the first outlet port (117);

a first column valve connection port (132) connected to the first column valve (150);

a second column valve connection port (133) connected to the second column valve (170); and a second pump connection port (134) connected to the second pump (P2), and wherein the step (A) comprises, in a state that the first sample storage loop connection port (114) and the second sample storage loop connection port (115) are connected to the sample inlet port (112) and the sample outlet port (113), respectively, receiving the sample from the sample injector(S) and injecting and storing the sample in the sample storage loop (111), in a state that the first pump connection port (116), the first outlet port (117), the first inlet port (131) and the first column valve connection port (132) are connected, feeding, by the first pump (P1), the first solvent into the column selection valve (130), feeding the first solvent fed into the column selection valve (130) into the first column valve (150) and injecting onto the first solid phase extraction column (SPE1) and the first sample separation column (COL1) to equilibrate the first solid phase extraction column (SPE1) and the first sample separation column (COL1), and in a state that the second pump connection port (134) and the second column valve connection port (133) are connected, feeding, by the second pump (P2), the first solvent into the column selection valve (130), feeding the first solvent fed into the column selection valve (130) into the second column valve (170) and injecting onto the second solid phase extraction column (SPE2) and the second sample separation column (COL2) to equilibrate the second solid phase extraction column (SPE2) and the second sample separation column (COL2).

3. The method for controlling a mutually independent dual online liquid chromatography device according to claim 2, wherein the first column valve (150) includes:

a first solid phase extraction column connection port (152) and a first solid phase extraction column transit port (153) connected to two ends of the first solid phase extraction column (SPE1), respectively;

a first solid phase extraction column inlet port (151) connected to the first column valve connection port (132), and selectively connected to the first solid phase extraction column connection port (152) and the first solid phase extraction column transit port (153);

a first sample separation column connection port (154) connected to the first sample separation column (COL1), and connected to or disconnected from the first solid phase extraction column connection port (152);

a second outlet port (155) disposed adjacent to the first solid phase extraction column transit port (153) and connected to or disconnected from the first solid phase extraction column transit port (153); and a first column outlet port (156) disposed adjacent to the first sample separation column connection port (154) and selectively connected to the first sample separation column connection port (154) and the second outlet port (155), wherein the second column valve (170) includes:

a second solid phase extraction column connection port (172) and a second solid phase extraction column transit port (173) connected to two ends of the second solid phase extraction column (SPE2), respectively;

a second solid phase extraction column inlet port (171) connected to the second column valve connection port (133), and selectively connected to the second solid phase extraction column connection port (172) and the second solid phase extraction column transit port (173);

a second sample separation column connection port (174) connected to the second sample separation column (COL2), and connected to or disconnected from the second solid phase extraction column connection port (172);

a third outlet port (175) disposed adjacent to the second solid phase extraction column transit port (173) and connected to or disconnected from the second solid phase extraction column transit port (173); and a second column outlet port (176) disposed adjacent to the second sample separation column connection port (174) and selectively connected to the second sample separation column connection port (174) and the third outlet port (175), wherein the step (B) comprises, in a state that the first pump connection port (116), the first sample storage loop connection port (114), the second sample storage loop connection port (115) and the first outlet port (117) are connected, the first inlet port (131) and the first column valve connection port (132) are connected, the first solid phase extraction column inlet port (151) and the first solid phase extraction column connection port (152) are connected and the first solid phase extraction column transit port (153) and the second outlet port (155) are connected, injecting the sample stored in the sample storage loop (111) onto the first solid phase extraction column (SPE1) together with the first solvent fed from the first pump (P1) and desalting and concentrating the sample, and in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the second pump (P2), the first solvent onto the second solid phase extraction column (SPE2) and the second sample separation column (COL2) to continuously equilibrate the second solid phase extraction column (SPE2) and the second sample separation column (COL2).

4. The method for controlling a mutually independent dual online liquid chromatography device according to claim 3, wherein the step (C) comprises, in a state that the first pump connection port (116) and the first outlet port (117) are connected, the first inlet port (131) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the first pump (P1), the mixed solution containing the first solvent and the second solvent onto the first solid phase extraction column (SPE1) and the first sample separation column (COL1) to perform the isocratic elution, and in a state that the second pump connection port (134) and the second column valve connection port (133) are connected, the second solid phase extraction column inlet port (171) and the second solid phase extraction column transit port (173) are connected, and the second solid phase extraction column connection port (172) and the second sample separation column connection port (174) are connected, injecting, by the second pump (P2), the first solvent onto the second solid phase extraction column (SPE2) and the second sample separation column (COL2) to continuously equilibrate the second solid phase extraction column (SPE2) and the second sample separation column (COL2).

5. The method for controlling a mutually independent dual online liquid chromatography device according to claim 4, wherein the step (D) comprises, in a state that the second pump connection port (134) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the second pump (P2), the mixed solution containing the increasing second solvent over time onto the first solid phase extraction column (SPE1) and the first sample separation column (COL1) to perform the gradient elution for separation and analysis of the sample, and at the same time, in a state that the first pump connection port (116) and the first outlet port (117) are connected, the first inlet port (131) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the first pump (P1), the first solvent onto the second solid phase extraction column (SPE2) and the second sample separation column (COL2) to continuously equilibrate the second solid phase extraction column (SPE2) and the second sample separation column (COL2), wherein the step (E) comprises, in a state that the second pump connection port (134) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the second pump (P2), the mixed solution containing the increasing second solvent over time onto the first solid phase extraction column (SPE1) and the first sample separation column (COL1) to perform gradient elution for separation and analysis of the sample, at the same time, in a state that the first sample storage loop connection port (114) and the second sample storage loop connection port (115) are connected to the sample inlet port (112) and the sample outlet port (113), respectively, receiving the sample from the sample injector(S) and injecting and storing the sample in the sample storage loop (111), and at the same time, in a state that the first pump connection port (116) and the first outlet port (117) are connected, the first inlet port (131) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the first pump (P1), the first solvent onto the second solid phase extraction column (SPE2) and the second sample separation column (COL2) to continuously equilibrate the second solid phase extraction column (SPE2) and the second sample separation column (COL2), wherein the step (F) comprises, in a state that the second pump connection port (134) and the first column valve connection port (132) are connected, the first solid phase extraction column inlet port (151) and the first solid phase extraction column transit port (153) are connected and the first solid phase extraction column connection port (152) and the first sample separation column connection port (154) are connected, feeding, by the second pump (P2), the mixed solution containing the increasing second solvent over time onto the first solid phase extraction column (SPE1) and the first sample separation column (COL1) to perform gradient elution for separation and analysis of the sample, and at the same time, in a state that the first pump connection port (116), the first sample storage loop connection port (114), the second sample storage loop connection port (115) and the first outlet port (117) are connected, the first inlet port (131) and the second column valve connection port (133) are connected, the second solid phase extraction column inlet port (171) and the second solid phase extraction column connection port (172) are connected and the second solid phase extraction column transit port (173) and the third outlet port (175) are connected, injecting the sample stored in the sample storage loop (111) onto the second solid phase extraction column (SPE2) together with the first solvent fed from the first pump (P1) and desalting and concentrating the sample, and wherein the step (G) comprises, in a state that the second pump connection port (134) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the second pump (P2), the mixed solution containing the increasing second solvent over time onto the first solid phase extraction column (SPE1) and the first sample separation column (COL1) to perform the gradient elution for separation and analysis of the sample, and at the same time, in a state that the first pump connection port (116) and the first outlet port (117) are connected, the first inlet port (131) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the first pump (P1), the mixed solution containing the first solvent and the second solvent onto the second solid phase extraction column (SPE2) and the second sample separation column (COL2) to perform the isocratic elution.

6. The method for controlling a mutually independent dual online liquid chromatography device according to claim 5, wherein when the step (I) comprises, in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, feeding, by the second pump (P2), the mixed solution containing the increasing second solvent over time into the second solid phase extraction column (SPE2) and the second sample separation column (COL2) to perform the gradient elution for separation and analysis of the sample, and at the same time, in a state that the first pump connection port (116) and the first outlet port (117) are connected, the first inlet port (131) and the first column valve, connection port (132) are connected, the first solid phase extraction column inlet port (151) and the first solid phase extraction column transit port (153) are connected and the first solid phase extraction column connection port (152) and the first sample separation column connection port (154) are connected, injecting, by the first pump (P1), the mixed solution containing the first solvent and the second solvent onto the first solid phase extraction column (SPE1) and the first sample separation column (COL1) to wash the first solid phase extraction column (SPE1) and the first sample separation column (COL1), wherein the step (J) comprises, in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, feeding, by the second pump (P2), the mixed solution containing the increasing second solvent over time into the second solid phase extraction column (SPE2) and the second sample separation column (COL2) to perform the gradient elution for separation and analysis of the sample, and at the same time, in a state that the first pump connection port (116) and the first outlet port (117) are connected, the first inlet port (131) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the first pump (P1), the first solvent onto the first solid phase extraction column (SPE1) and the first sample separation column (COL1) to equilibrate the first solid phase extraction column (SPE1) and the first sample separation column; (COL1), wherein the step (K) comprises, in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the second pump (P2), the mixed solution containing the increasing second solvent over time onto the second solid phase extraction column (SPE2) and the second sample separation column (COL2) to perform the gradient elution for separation and analysis of the sample, at the same time, in a state that the first sample storage loop connection port (114) and the second sample storage loop connection port (115) are connected to the sample inlet port (112) and the sample outlet port (113), respectively, receiving the sample from the sample injector(S) and injecting and storing the sample in the sample storage loop (111), and at the same time, in a state that the first pump connection port (116) and the first outlet port (117) are connected, the first inlet port (131) and the first column valve connection port (132) are connected, the first solid phase extraction column inlet port (151) and the first solid phase extraction column transit port (153) are connected and the first solid phase extraction column connection port (152) and the first sample separation column connection port (154) are connected, injecting, by the first pump (P1), the first solvent onto the first solid phase extraction column (SPE1) and the first sample separation column (COL1) to continuously equilibrate the first solid phase extraction column (SPE1) and the first sample separation column (COL1), wherein the step (L) comprises, in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the second pump (P2), the mixed solution containing the increasing second solvent over time onto the second solid phase extraction column (SPE2) and the second sample separation column (COL2) to perform the gradient elution for separation and analysis of the sample, and at the same time, in a state that the first pump connection port (116), the first sample storage loop connection port (114), the second sample storage loop connection port (115) and the first outlet port (117) are connected, the first inlet port (131) and the first column valve connection port (132) are connected, the first solid phase extraction column inlet port (151) and the first solid phase extraction column connection port (152) are connected and the first solid phase extraction column transit port (153) and the second outlet port (155) are connected, injecting the sample stored in the sample storage loop onto the first solid phase extraction column together with the first solvent fed from the first pump and desalting and concentrating the sample, and wherein the step (M) comprises, in a state that the second pump connection port (134) and the second column valve connection port (133) are connected, the second solid phase extraction column inlet port (171) and the second solid phase extraction column transit port (173) are connected and the second solid phase extraction column connection port (172) and the second sample separation column connection port (174) are connected, injecting, by the second pump (P2), the mixed solution containing the increasing second solvent over time onto the second solid phase extraction column (SPE2) and the second sample separation column (COL2) to perform the gradient elution for separation and analysis of the sample, and at the same time, in a state that the first pump connection port (116) and the first outlet port (117) are connected, the first inlet port (131) and the first column valve connection port (132) are connected, the first solid phase extraction column inlet port (151) and the first solid phase extraction column transit port (153) are connected and the first solid phase extraction column connection port (152) and the first sample separation column connection port (154) are connected, feeding, by the first pump (P1), the mixed solution containing the first solvent and the second solvent onto the first solid phase extraction column (SPE1) and the first sample separation column (COL1) to perform the isocratic elution.

7. The method for controlling a mutually independent dual online liquid chromatography device according to claim 5, wherein when the step (O) comprises repeatedly performing the steps (D) to (N) in a sequential order, the step (D) comprises, before equilibrating the second solid phase extraction column (SPE2) and the second sample separation column (COL2), in a state that the first pump connection port (116) and the first outlet port (117) are connected and the first inlet port (131) and the second column valve connection port (133) are connected, injecting, by the first pump (P1), the mixed solution containing the first solvent and the second solvent onto the second solid phase extraction column (SPE2) and the second sample separation column (COL2) to wash the second solid phase extraction column (SPE2) and the second sample separation column (COL2).

8. The method for controlling a mutually independent dual online liquid chromatography device according to claim 1, wherein the step (H) comprises matching an end time of the separation and analysis of the sample in the first sample separation column (COL1) with a time immediately before a first peptide is eluted from the second sample separation column (COL2).

9. The method for controlling a mutually independent dual online liquid chromatography device according to claim 1, wherein when the step (N) comprises matching an end time of the separation and analysis of the sample in the second sample separation column (COL2) with a time immediately before a first peptide is eluted from the first sample separation column (COL1).

* * * * *